United States Patent
Calnek (10) Patent No.: US 9,566,903 B1
(45) Date of Patent: Feb. 14, 2017

(54) MULTI-VEHICLE USER-ASSISTANCE SYSTEMS AND METHODS

(71) Applicant: GM GLOBAL TECHNOLOGY OPERATIONS LLC, Detroit, MI (US)

(72) Inventor: Scott Calnek, Whitby (CA)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/806,294

(22) Filed: Jul. 22, 2015

(51) Int. Cl.
| | |
|---|---|
| *B60Q 1/52* | (2006.01) |
| *A61G 3/00* | (2006.01) |
| *B60Q 1/04* | (2006.01) |
| *B60Q 1/30* | (2006.01) |
| *B60Q 5/00* | (2006.01) |
| *B60R 1/00* | (2006.01) |
| *H04W 4/02* | (2009.01) |

(52) U.S. Cl.
CPC . *B60Q 1/52* (2013.01); *B60Q 1/04* (2013.01); *B60Q 1/30* (2013.01); *B60Q 5/005* (2013.01); *B60R 1/00* (2013.01); *H04W 4/02* (2013.01); *B60R 2300/8073* (2013.01)

(58) Field of Classification Search
CPC .......... B60Q 1/52; B60Q 1/323; B60Q 1/484; H04B 10/22; A61G 3/00; G08G 1/0962; G08G 1/00; G08G 1/166; G07C 9/00309; H04N 7/152; B60R 25/04; B60R 25/1012; H04W 4/22
USPC ... 701/2, 29.1, 99; 340/902, 458, 5.61, 5.62, 340/426.13; 348/46; 362/464; 455/404.2
See application file for complete search history.

(56) References Cited

U.S. PATENT DOCUMENTS

| | | | | |
|---|---|---|---|---|
| 5,612,668 | A * | 3/1997 | Scott | B60R 25/1012 340/426.13 |
| 6,700,476 | B1 * | 3/2004 | Okada | B60R 25/04 340/12.51 |
| 7,084,570 | B2 | 8/2006 | Oyaski | |
| 8,860,787 | B1 * | 10/2014 | Neven | H04N 7/152 348/46 |
| 9,014,943 | B2 * | 4/2015 | Mohn | G08G 1/00 340/439 |
| 2003/0147247 | A1 * | 8/2003 | Koike | B60Q 1/484 362/464 |
| 2007/0030136 | A1 * | 2/2007 | Teshima | B60Q 1/323 340/458 |
| 2011/0121991 | A1 * | 5/2011 | Basir | G08G 1/0962 340/902 |
| 2013/0057396 | A1 | 3/2013 | Winslow | |

(Continued)

FOREIGN PATENT DOCUMENTS

GB 2326298 A * 12/1998 ............. H04B 10/22

*Primary Examiner* — Yuri Kan
(74) *Attorney, Agent, or Firm* — Dierker & Kavanaugh, P.C.

(57) ABSTRACT

In an example of a multi-vehicle user-assistance method, a central server receives a request from a mobile device. The request includes a location of the mobile device. A central processing unit of the central server identifies a location of a plurality of participating vehicles positioned within proximity of the mobile device. The participating vehicles are unassociated with the mobile device. Instructions are respectively transmitted to at least some of the participating vehicles to activate an exterior lighting component i) as the mobile device is within proximity of the at least some of the participating vehicles or ii) as part of a vehicle lighting pattern.

21 Claims, 5 Drawing Sheets

(56) References Cited

U.S. PATENT DOCUMENTS

| | | | |
|---|---|---|---|
| 2014/0067189 A1* | 3/2014 | Smith | G08G 1/166 701/29.1 |
| 2014/0149032 A1 | 5/2014 | Barrett et al. | |
| 2014/0225719 A1 | 8/2014 | Kesavan et al. | |
| 2015/0050906 A1* | 2/2015 | Yuasa | H04W 4/22 455/404.2 |
| 2015/0088339 A1* | 3/2015 | Fisher | A61G 3/00 701/2 |
| 2016/0055699 A1* | 2/2016 | Vincenti | G07C 9/00309 340/5.61 |

* cited by examiner

MULTI-VEHICLE USER-ASSISTANCE SYSTEMS AND METHODS

TECHNICAL FIELD

The present disclosure relates generally to multi-vehicle user-assistance systems and methods.

BACKGROUND

Vehicles are equipped with several components that assist the driver in operating the vehicle. As one example, vehicles include rear and side view mirrors to assist the driver in seeing what is behind and next to his/her vehicle. A growing trend has been the integration of electronic devices, such as smart phones, MP3 players, tablet computers, global positioning systems, digital video disc (DVD) players, etc., in vehicles. Some vehicles are equipped with an in-vehicle communications platform (e.g., telematics unit and/or infotainment units) or other in-vehicle controller that enables several services/features within the vehicle, either alone or in conjunction with an external electronic device. For example, the in-vehicle communications platform may pair (communicate wirelessly) with a smart phone, allowing the driver to make phone calls, send text messages, play music, and navigate to a destination using voice commands.

SUMMARY

In an example of a multi-vehicle user-assistance method, a central server receives a request from a mobile device. The request includes a location of the mobile device. A central processing unit of the central server identifies a location of a plurality of participating vehicles positioned within proximity of the mobile device. The participating vehicles are unassociated with the mobile device. Instructions are respectively transmitted to at least some of the participating vehicles to activate an exterior lighting component i) as the mobile device is within proximity of the at least some of the participating vehicles or ii) as part of a vehicle lighting pattern.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

The multi-vehicle user-assistance system(s) disclosed herein includes an interconnected network of vehicles to provide enhanced services to a user. In some examples, the interconnected network of vehicles includes a plurality of participating vehicles and a central server. The central server receives a request from the user through his/her mobile device directly or indirectly, and responds to the request using at least some of the vehicles in the interconnected network. The use of multi-vehicles allows the server to provide improved services to the user. In other examples, the interconnected network of vehicles includes the user's vehicle and other vehicles that are within proximity of the user's vehicle. In these other examples, vehicle-to-vehicle communication is utilized to provide improved services to the user.

In the examples disclosed herein, the "participating vehicle" refers to a vehicle that is enrolled in an enhanced feature service. The enrolled vehicle is linked to the vehicle owner and/or any number of pre-authorized drivers. Additionally, a single user (e.g., owner and/or pre-authorized driver) may be linked to several vehicles. It is to be understood that a vehicle owner or operator who wishes to participate in the enhanced feature service may sign up or enroll through a center that operates the enhanced feature service (e.g., via a web page, by calling an advisor at the center, etc.). Upon signing up, a profile may be generated for the user and/or vehicle and stored at the center. Alternatively, if the center already maintains the user and/or vehicle profile when the user enrolls, this profile may be accessed and updated to reflect the involvement in the enhanced feature service.

It is to be understood that the participating vehicles may be owned by individuals, or may part of a vehicle fleet or a car share program. In the latter instances, the vehicle owner may be an entity that owns the fleet or runs the car share program.

The profile may include the participating vehicle make and model, the vehicle identification number or an enhanced feature service identification number assigned to the vehicle, the name of each user associated with the participating vehicle (e.g., owner and his/her family members, employees of a fleet, etc., contact person of an entity that owns the vehicle, etc.), contact information for each user associated with the participating vehicle, and/or combinations thereof. When the participating vehicle is part of a car share program, the contact information may be updated when the car is assigned to a new driver. For example, the mobile device phone number of the new driver may be temporarily stored in the profile until another new driver is assigned the particular vehicle.

Figure 1:
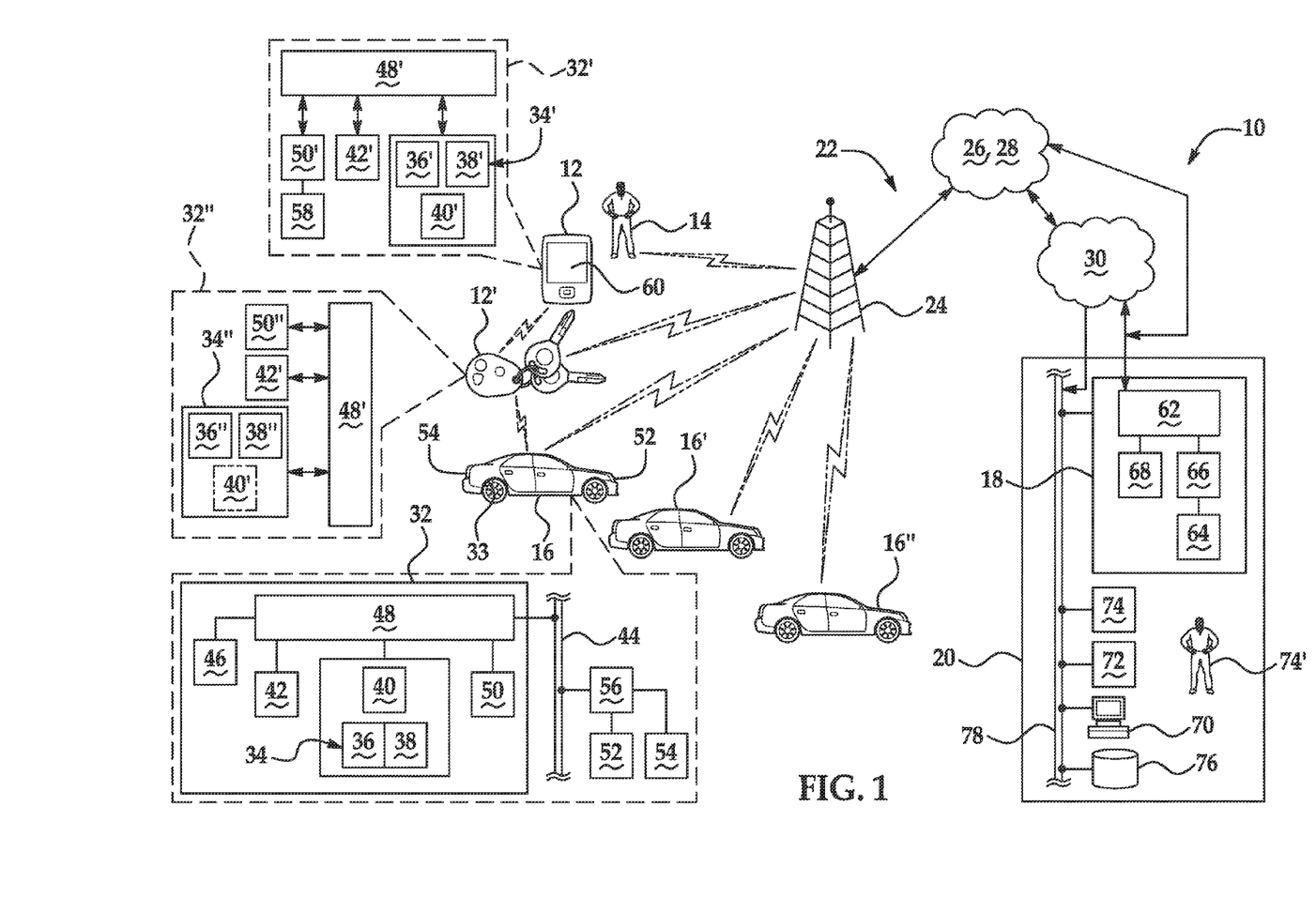
FIG. 1 is a schematic view of an example of a multi-vehicle user-assistance system.

Referring now to FIG. 1, an example of the multi-vehicle user-assistance system 10 is depicted. The system 10 includes a mobile device (shown as a smart phone 12 or a passive entry passive start device 12') of the requester/user 14, the plurality of participating vehicles 16, 16', 16", the central server 18 (which may be part of a center 20 that provides back-end services to the participating vehicles 16, 16', 16" and operates the enhanced feature service), and a carrier/communication system 22.

Phone calls and/or messages (e.g., request messages, etc.) and/or commands may be transmitted to, from, and/or between communication component(s) of the vehicle(s) 16, 16', 16", the mobile devices 12, 12' and/or the center 20 using the carrier/communication system 22. Some of the communication links between the various components are shown as lightning bolts and arrows in FIG. 1.

In an example, the carrier/communication system 22 is a two-way radio frequency (RF) communication system. The carrier/communication system 22 may include one or more cell towers 24 or satellites (not shown). It is to be understood that the carrier/communication system 22 may also include one or more base stations and/or mobile switching centers (MSCs) 26 (e.g., for a 2G/3G network), one or more evolved Node Bs (eNodeB) and evolved packet cores (EPC) 28 (for a 4G (LTE) network), and/or one or more land networks 30. The carrier/communication system 22 may be part of a cellular radio environment or a satellite radio environment, which may include a variety of wireless network providers (which include mobile network operator(s), not shown), utilizing the same or a variety of radio access technologies. While several examples have been provided, it is to be understood that the architecture of the wireless carrier/communication system 22 may be GSM (global system for mobile telecommunications), CDMA2000, UMTS (universal mobile telecommunications system), LTE (long-term evolution), or some other available architecture.

An Internet connection may also be utilized for the transmission of the message(s), command(s), data, etc. The transmission of the messages, data, etc. may be made using the carrier/communication system 22, either through the vehicle's Internet connection (e.g., when the vehicle 16, 16', 16" is equipped with a 4G long-term evolution, LTE, or other suitable Internet connection) or through the mobile device's cellular and Internet connection (e.g., when the mobile device 12, 12' is paired with the vehicle 16, 16', 16").

In some instances, the message(s) and/or command(s) may be transmitted to, from, and/or between communication component(s) of the vehicle(s) 16, 16', 16" and the mobile devices 12, 12' using short range wireless communication technology. Each of the vehicles 16, 16', 16" and the mobile devices 12, 12' includes a respective communications platform, referred to herein as the vehicle communications platform (VCP) 32 and the mobile device communications platform (MDCP) 32', 32". Each of the communications platforms 32, 32', 32" is equipped with a respective transceiver 34, 34', 34" which is capable of short range wireless communications. Each transceiver 34, 34', 34" includes a respective signal emitter 36, 36', 36" for transmitting signals/data and a respective signal receiver 38, 38', 38" for receiving signals/data.

In some of the examples disclosed herein, the vehicle communications platform 32 is in short range wireless communication with the mobile device communications platform 32' and/or 32". In other examples disclosed herein, the mobile device communications platforms 32' and 32" are in short range wireless communication with each other. In still other instances, the communication platform 32" may be in short range wireless communication with a tire pressure monitor (TPM) 33 that is configured for short range wireless communications. The communications platforms 32, 32', 32" and in particular, the transceivers 34, 34', 34" and the TPM 33 may communicate via any short range wireless communication technology, such as BLUETOOTH® and various classes thereof (e.g., BLUETOOTH® low energy (LE), BLUETOOTH® smart, etc.), dedicated short range communications (DSRC), or WI-FI™ and various classes thereof. When WI-FI™ and various classes thereof are utilized, the communications platforms 32, 32', 32" may also utilize a cellular adapter (e.g., shown as 40 in the VCP 32 and 40' in the MDCP 32' and 32").

Different short range wireless communication technologies are configured for different distances. For the communications between any of the communication platforms 32, 32', 32" or one of the communication platforms 32, 32', 32" and TPM 33, relatively short distances may be suitable. For example, when the communication platforms 32, 32', 32" are each configured for some BLUETOOTH® connections, they may have a preset wireless access range, or may have a standard range from about 10 meters (i.e., about 32 feet) to about 100 meters (i.e., about 330 feet).

It is to be understood that each of the communication platforms 32, 32', 32" and the TPM 33 has a unique identifying code (e.g., a wireless connection key) that is used to pair one of the communications platforms 32, 32', 32" or the TPM 33 with another of the communications platforms 32, 32', 32" or the TPM 33. Two devices are paired with each other when they exchange their unique identifying codes with each other. For example, the VCP 32 and the MDCP 32' are paired when they exchange their unique identifying codes with each other. This enables the VCP 32 and the MDCP 32' to communicate typically under a secured connection.

As a more specific example, initial pairing may involve setting the mobile device 12, 12' to a short range wireless discovery mode (such as by selecting, on the mobile device 12, 12', a discovery mode function as a menu option, icon, or the like). While in the discovery mode, other devices configured for short range wireless communications (such as the VCP 32, the other of the mobile devices 12', 12, and/or the TPM 33) are allowed to detect the presence of the mobile device 12, 12'. When the VCP 32, the other of the mobile devices 12', 12, and/or the TPM 33 locates the mobile device 12, 12', the mobile device 12, 12' automatically provides the type of device it is (e.g., a smart phone, a passive entry passive start device, etc.) and its short range wireless connection name. The mobile device 12, 12' may then prompt the user to enter a security code/password, and then the unique identifying code of the mobile device 12, 12' is sent to the VCP 32, the other of the mobile devices 12', 12, and/or the TPM 33. Upon receiving the unique identifying code, the VCP 32, the other of the mobile devices 12', 12, and/or the TPM 33 sends its own unique identifying code to the mobile device 12, 12' to ultimately pair the two devices 12 and 32, or 12' and 32, or 12 and 12', or 12 or 12' and 33 together. The devices 12, 12', 32, 33 may or may not be paired.

It is to be understood that in the examples disclosed herein, features of the short range wireless communication technology may also be utilized to determine the location of the mobile device 12, 12' relative to the participating vehicle(s) 16, 16', 16".

The vehicles 16, 16', 16" participating in the enhanced feature service may be cars, motorcycles, trucks, or recreational vehicles (RV). The vehicles 16, 16', 16" are equipped with suitable hardware and computer readable instructions/code that enable them to communicate (e.g., transmit and/or receive voice and data communications) over the carrier/communication system 22 (e.g., with the central server 18). As mentioned above, the vehicle(s) 16, 16', 16" may also be capable of communicating using the short range wireless communication technology. The components of vehicle 16 will be described in more detail, although it is to be understood that each of the other vehicles 16', 16" may be equipped with the same or similar components.

As shown in FIG. 1, the vehicle 16 includes the vehicle communications platform (VCP) 32. In an example, the VCP 32 is an on-board vehicle dedicated communications and entertainment device. In another example (not shown), the VCP 32 is an on-board vehicle dedicated communications device (e.g., a telematics unit), and the vehicle 16 includes a separate on-board vehicle dedicated entertainment device (e.g., an infotainment unit). Whether integrated into a single unit (e.g., VCP 32) or included as separate units, the on-board vehicle dedicated communications and entertainment device(s) include hardware components that are capable of running computer readable instructions/code, which are embodied on non-transitory, tangible computer readable media.

The VCP 32 may provide a variety of services, both individually and through its communication with the center 20 (e.g., which may be a facility that is owned and operated by an in-vehicle infotainment unit service provider). Several examples of these services include, but are not limited to: examples of the enhanced feature service disclosed herein, turn-by-turn directions and other navigation-related services provided in conjunction with a location detection module 42; airbag deployment notification and other emergency or roadside assistance-related services provided in connection with various sensor interface modules and sensors located throughout the vehicle 16; and infotainment-related services where music, Web pages, movies, television programs, videogames and/or other content is downloaded by the VCP 32 via a vehicle bus system 44 and an audio bus system (not shown). The listed services are by no means an exhaustive list of all the capabilities of the VCP 32, but are simply an illustration of some of the services that the VCP 32 is capable of offering.

As noted above, the VCP 32 may be used for vehicle communications. Some vehicle communications (e.g., between the vehicle 16 and the central server 18 at the center 20) utilize radio or satellite transmissions to establish a voice channel with the carrier/communication system 22 such that both voice and data transmissions may be sent and received over the voice channel. In some instances, vehicle communications are enabled through the VCP 32 via the cellular adapter 40, which includes a cellular chipset/component for voice communications and a data transmission system for data transmission.

The cellular chipset/component of the cellular adapter 40 may be an analog, digital, dual-mode, dual-band, multi-mode and/or multi-band wireless transceiver. The cellular chipset-component uses one or more prescribed frequencies in standard analog and/or digital bands in the current market for cellular systems. Any suitable protocol may be used, including digital transmission technologies, such as TDMA (time division multiple access), CDMA (code division multiple access), W-CDMA (wideband CDMA), FDMA (frequency-division multiple access), OFDMA (orthogonal frequency-division multiple access), etc.

In an example, the data transmission system of the cellular adapter 40 may include a packet builder, which is programmed to make decisions about what packet to send (e.g., bandwidth, data to include, etc.) and to actually build a packet data message. In another example, the data transmission system may include a wireless modem, which applies some type of encoding or modulation to convert the digital data so that it can communicate through a vocoder or speech codec incorporated in the cellular chipset/component. It is to be understood that any suitable encoding or modulation technique that provides an acceptable data rate and bit error may be used with the examples disclosed herein. While examples have been provided, it is to be understood that any suitable data transmission system may be used.

The location detection unit 42 may include a GPS receiver, a radio triangulation system, a dead reckoning position system, and/or combinations thereof. In particular, a GPS receiver provides accurate time and latitude and longitude coordinates of the vehicle 16 responsive to a GPS broadcast signal received from a GPS satellite constellation (not shown). The location detection unit 42 may also include, for example, Glonass (i.e., global navigation satellite system), Sbas (i.e., satellite-based augmentation systems), or a D-GPS (differential global positioning system). The location detection unit 42 may or may not be part of an in-vehicle navigation unit.

The location detection unit 42 in each of the vehicles 16, 16', 16" provides the central server 18 with the current location of the vehicles 16, 16', 16" in response to a request for such information from the central server 18. As will be described in detail below, the central server 18 will utilize the location information from one or more of the vehicles 16, 16', 16" in order to respond to an enhanced feature service request from the mobile device 12, 12'.

The VCP 32 may also include a real-time clock (RTC) 46. The real-time clock (RTC) 46 provides accurate date and time information to the VCP 46 hardware and software components that may require and/or request date and time information. In an example, the RTC 46 may provide time and/or date information for an enhanced feature service request that is received from the mobile device 12, 12'.

The VCP 32 also includes an electronic processing device 48 operatively coupled to one or more types of electronic memory 50. In an example, the electronic processing device 44 is a microprocessor. In other examples, the electronic processing device 44 may be a micro controller, a controller, and/or a host processor. In another example, electronic processing device 48 may be an application specific integrated circuit (ASIC). The electronic memory 50 of the VCP 32 may be an encrypted memory that is configured to store i) computer readable instructions/code to be executed by the processor 48, ii) data associated with the various systems of the vehicle 16 (i.e., vehicle data, VIN, enhanced feature service identification number, etc.), and the like. The electronic memory 50 may be a non-transitory, tangible computer readable media (e.g., RAM).

The VCP 32 is operatively connected to the vehicle bus system 44. The vehicle bus system 44 may utilize a variety of networking protocols, such as a controller area network (CAN), a media oriented system transfer (MOST), a local interconnection network (LIN), an Ethernet, TCP/IP, and other appropriate connections such as those that conform with known ISO, SAE, and IEEE standards and specifications, to name a few. The vehicle bus system 44 enables the vehicle 16 to send signals (e.g., real-time bus messages, alert notifications) from the infotainment unit 32 to various units of equipment and systems both outside the vehicle 16 (e.g., central server 18) and within the vehicle 16 (e.g., exterior lighting component(s) 52, 54). The vehicle bus system 44 also enables the vehicle 12 to receive signals at the infotainment unit 32 from various units of equipment and systems both outside the vehicle 16 and within the vehicle 16. An example of a signal received by the vehicle bus 44 includes a command from the central server 18 instructing a body control module 56 to activate the exterior lighting component(s) 52, 54. An example of a signal transmitted by the vehicle bus 44 includes a message from the processor 48 to the central server 18 including the current location of the vehicle 16.

As illustrated in FIG. 1, the vehicle 16 may also include other vehicle systems that are directly or indirectly connected to the vehicle bus system 44. Example of these other vehicle systems may include exterior lighting components, such as headlight(s) 52, tail light(s) 54, side marker light(s) (not shown, examples of which include lamp(s)/light(s) positioned on the side of the vehicle body, lamp(s)/light(s) positioned in the side view mirrors, etc.), or any other external illumination device. The exterior lighting components 52, 54 may be operatively connected to and controlled by the body control module 56, which is operatively connected to the vehicle bus system 44. Through the vehicle bus system 44, the body control module 56 is capable of receiving command(s) and/or instruction(s) from the central server 18. In response to, and in accordance with the received command(s) and/or instruction(s), the body control module 56 controls, as one example, the operation of the headlight(s) 52 and/or tail light(s) 54 and/or side marker light(s), and/or combinations thereof. Still other examples of the other vehicle systems include cameras and alarm systems, each of which may be operatively connected to the vehicle bus system 44 through other module(s) on the vehicle bus system 44.

Also as illustrated in FIG. 1, the vehicle 16 may include the tire pressure monitor TPM 33. The TPM 33 may include a tire pressure monitor communications platform and a tire pressure sensor. The tire pressure monitor communications platform is equipped with a transceiver that is capable of short range wireless communications. In the examples disclosed herein, the communications platform of the TPM 33 may be used as an information conduit between, for example, the MDCP 32', 32" of the mobile devices 12, 12' and the VCP 32. In an example, the tire pressure monitor communications platform pairs with the VCP 32 and the MDCP 32', 32" and can transmit data between the devices 32 and 32' and/or 32".

The multi-vehicle user-assistance system 10 disclosed herein also includes the mobile device 12, 12'. The mobile device 12 may be a smart phone, such as a GSM/LTE phone or a GSM/CDMA/LTE phone, and/or the mobile device 12' may be a passive entry passive start (PEPS) device or other smart key fob. In other examples, the mobile device 12, 12' may be any portable device that has the mobile device communication platform 32', 32", a processor 48', and a location detection module 42'. Examples of other mobile devices 12, 12' include a wearable device (e.g., foot pod, smart bracelet, smart watch, helmet, etc.), tablet, etc., each of which may be, for example, GPS, cellular/Internet wireless communication enabled and/or short range wireless communication enabled. The short range wireless communication capability (e.g., BLUETOOTH® and variations thereof) enables the mobile device 12, 12' to communicate with the vehicle 16, 16', or 16" via short range communication technologies.

In the examples disclosed herein, the user 14 utilizes the mobile device 12, 12' to request an enhanced service. Various examples of the mobile device 12, 12' (e.g., the smart phone 12 and the PEPS device 12') may be used independently or together in any of the examples disclosed herein. In one example, the enhanced service is a request to light the user's path as he/she heads toward his/her vehicle 16. This example will be described in further detail in reference to FIGS. 2A-2C. In another example, the enhanced service is a request for assistance in finding/locating the user 14. This example will be described in further detail in reference to FIG. 3. In addition to these enhanced services, the examples disclosed herein may also trigger vehicle camera surveillance, vehicle alarms, and/or data collection events. Each of these enhanced services will be described further in reference to FIGS. 2A-2C and 3.

The location detection module 42' of the mobile devices 12, 12' may be similar to the location detection module 42 of the vehicle 16.

The MDCP 32' of the mobile device 12 includes the transceiver 34' for short range wireless communication and the cellular adapter 40' for voice and data communication using the wireless carrier/communication system 22. This example of the mobile device 12 enables the user 14 to transmit the enhanced service request directly to the central server 18 over the wireless carrier/communication system 22.

The MDCP 32" of the mobile device 12' includes the transceiver 34' for short range wireless communication and may or may not include the cellular adapter 40' for voice and data communication using the wireless carrier/communication system 22. When the mobile device 12' does include the cellular adapter 40', the mobile device 12' enables the user 14 to transmit the enhanced service request directly to the central server 18 over the wireless carrier/communication system 22 (through WI-FI™). When the mobile device 12' does not include the cellular adapter 40', the mobile device 12' enables the user 14 to transmit the enhanced service request indirectly to the central server 18. In this example, the enhanced service request is transmitted from the mobile device 12' (e.g., PEPS device) to the vehicle 16 (e.g., through the VCP 32 or the TPM 33) or to the mobile device 12 (e.g., smart phone), either of which is associated with the mobile device 12' and within short range wireless communication range with the mobile device 12'. The vehicle 16 component or the mobile device 12 then transmits the request to the central server 18 over the wireless carrier/communication system 22.

Each of the mobile devices 12, 12' includes physical hardware (e.g., the microprocessor 48') and computer readable instructions stored in an electronic memory 50', 50". The respective microprocessors 48' of the mobile devices 12, 12' may be similar to processor 48 of the vehicle 16, and are capable of executing the computer readable instructions stored in the respective memories 50', 50", which may be similar to the electronic memory 50.

The electronic memory 50' of the mobile device 12 may store thereon computer readable instructions of an enhanced feature service application 58. The enhanced feature service application 58 may be downloaded (e.g., from an online application store or marketplace) and stored on the electronic memory 50'. The application 58 may be opened by the user 14 using a display 60 of the mobile device 12. In an example, the display 60 is a full-color touch screen display. Other examples of the display 60 include a VFD (Vacuum Fluorescent Display), an LED (Light Emitting Diode) display, an LCD (Liquid Crystal Diode) display, and/or the like.

The application 58 may follow a model/view/controller design pattern. The model contains the specific data and business logic for the application 58, the view is an interface on the mobile device 12 that allows a user to view the data, and the controller (e.g., processor 48') performs operations on the data. The view visually provides data, information, options, etc. to the user 14 of the mobile device 12, and also enables the user to interact with the application using swipes, gestures, taps, touches, tables, etc. The controller is between the model and the view, and acts as a dispatcher between two. More specifically, the controller provides model data to the view, and interprets user actions (received at the view), such as button clicks or touch screen inputs. The controller depends on the view and the model. In the examples disclosed herein, the controller, model, and view are part of the mobile device 12, or the model may be an external storage device to which the controller (e.g., processor 48') has access.

The application 48 may or may not require the user 14 to log in or be authenticated in some manner (e.g., through a password, biometrics, etc.). Once opened, the view enables the user 14 to enter the request for the enhanced service. The enhanced service request includes at least type of request (e.g., path lighting, user locator, etc.) and the location of the mobile device 12, 12'. The type of request may be entered manually by the user 14 or may be selected from a menu or a pop-up window generated by the application 58. In an example, the pop-up window includes icons indicative of the various services for the user to select from. The application 58 can retrieve the then-current location of the mobile device 12 through the location detection module 42'.

The electronic memory 50" of the mobile device 12' may store thereon computer readable instructions, that when executed by the processor 48' of the mobile device 12', trigger a request to be sent to the central server 18 directly or indirectly. The execution of a particular set of computer readable instructions, which generate a pre-set request, may be triggered by a particular button on the face of the mobile device 12'. For example, similar to a panic button (which triggers a vehicle alarm), the mobile device 12' may include a path lighting button and a user locator button. When these respective buttons are pressed, the processor 48' of the mobile device 12' runs the associated computer readable instructions and generates the associated enhanced feature service request.

The devices 12, 12' may also be programmed to initiate the request without a specific prompt from the user. For example, the user 14 may preset the device 12, 12' to transmit the request at a particular time on a particular day. More specifically, the user 14 may preset the request to be sent Monday through Friday at 9 pm, when he/she leaves work. The devices 12, 12' may also be programmed to send the request when certain parameters are recognized (device 12, 12' is moving toward the vehicle 16, external conditions indicate that it is dark outside, etc.).

The application 48 of the mobile device 12 or the computer readable instructions stored on the memory 50" of the mobile device 12' may be programmed to include a header in the request. In these examples, the header identifies the mobile device 12, 12' from which the enhanced feature service request is being sent and also includes a time-stamp of the request. The mobile device information may be used by the central server 18 to identify the vehicle 16 that is associated with the mobile device 12, 12'. The time-stamp may be generated by a real-time clock of the mobile device 12, 12'. In some instances, the request is generated by the mobile device 12' and transmitted to the VCP 32 of the vehicle 16 associated with the mobile device 12' (directly or through the TPM 33). In these instances, the VCP 32 may be programmed to add the header to the received request, or to update the header in the received request with vehicle information. For example, the header in the request from the mobile device 12' may include an identifier for the mobile device 12', and the VCP 32 may be programmed to add vehicle-related information and a time-stamp to the header. In an example, the VCP 32 may add the vehicle's mobile dialing number, the vehicle identification number, the VCP serial number, the enhanced feature service identification number, etc. The time-stamp may be generated by the real-time clock 46 of the vehicle 16. If included, the mobile device 12, 12' and/or vehicle 16 identifying information in the header enables the central server 18 to identify the vehicle 16 associated with the request.

The multi-vehicle user-assistance system 10 disclosed herein also includes the central server 18. The central server 18 may be a dedicated server that participates in servicing enhanced feature service requests. The central server 18 is a system of computer hardware (e.g., central processing unit 62) and computer readable instructions that is capable of responding to enhanced feature service requests received directly or indirectly from the mobile devices 12, 12'.

The central processing unit 62 may be a controller, a host processor, or an ASIC. The central processing unit 62 is capable of executing the computer readable instructions of a real-time enhanced feature service program 64 stored on an electronic memory 66 of the central server 18.

The central server 18 also includes a server communication transceiver 68 that is in selective communication with the VCP 32, MDCP 34', and in some instances the MDCP 34". The server communication transceiver 68 may be any suitable data transmission system that is capable of sending and/or receiving data communications over the carrier/communication system 22. For example, the server communication transceiver 68 is capable of receiving the enhanced feature service request (including at least the mobile device 12, 12' location and the mobile device 12, 12' and/or vehicle 16 identifier) directly or indirectly from the MDCP 34' or the MDCP 34". In one example, the server communication transceiver 68 is capable of receiving the enhanced feature service request indirectly from the MDCP 34", which transmits the request through the VCP 32.

As mentioned above, the central server 18 also includes the real-time enhanced feature service program 64 stored on its electronic memory 66. As will be described in further detail in reference to FIGS. 2A-2C and 3, the real-time enhanced feature service program 64 is executed by the central processing unit 62 when the enhanced service feature request is received by the central server 18. When executed, the real-time enhanced feature service program 64 enables the central processing unit 62 to generate customized instructions that are transmitted to a select number of the identified participating vehicles 16, 16', 16" within proximity of the mobile device 12, 12'. The customized instructions command the select number of participating vehicles 16, 16', 16" to activate the exterior lighting component 52 and/or 54 at a particular time or in accordance with a lighting pattern generated by the central processing unit 62 running the real-time enhanced feature service program 64. While the following examples reference exterior lighting components 52 and/or 54, it is to be understood that any of the exterior lighting components may be utilized in the examples, and are not limited to the headlight(s) 52 and/or tail light(s) 54. The customized instructions may also command the select number of participating vehicles 16, 16', 16" to activate their cameras, alarm systems, or a data collection event.

As shown in FIG. 1, the central server 18 may be located at the center 20 that provides back-end services to the participating vehicles 16, 16', 16" and operates the enhanced feature service. In addition to the central server 18, the center 20 may also include other components, such as additional computing equipment 70, switch(es) 72, advisor(s) 74, 74', database(s) 76, and a network connection or bus 78.

The center computing equipment 70, which is often used in conjunction with telecommunication equipment (not shown), is generally equipped with suitable hardware and software and/or programs enabling the hardware of the computing equipment 70 to accomplish a variety of center functions. The computing equipment 70 may be programmed to carry out some of the tasks/operations of the center 20. The telecommunication and computing equipment 70 may include a network of servers (including central server 18) coupled to both locally stored and remote databases (e.g., database 76) of any information processed.

The center 20 may also include switch(es) 72. The switch 72 may be a private branch exchange (PBX) switch. The switch 72 routes incoming signals so that voice transmissions are usually sent to either a live advisor 74' or the automated response system 74, and data transmissions are passed on to a modem or other piece of equipment (e.g., a communications module) for demodulation and further signal processing. The modem may include an encoder, and may be connected to various devices such as the server 18 and database 76.

The center 20 also includes live and/or automated advisors 74', 74. Each advisor 74', 74 may be associated with a workstation, including telecommunication and computing equipment 70.

The database(s) 76 at the center 20 may be designed to store vehicle record(s), subscriber/user profile records, or any other pertinent subscriber and/or vehicle information and/or mobile device information. In an example, the database(s) 76 may be configured to store the user profile, which may contain personal information of the subscriber/user 14 (e.g., the subscriber's name, garage/home address, billing address, home phone number, cellular phone number, etc.), enhanced feature service identification number, etc. The central server 18 may utilize the information in the database to determine which vehicle 16 is associated with the mobile device 12, 12' sending the enhanced service request (e.g., when a vehicle identifier is not included in the request).

It is to be understood that the databases 76 may allow the center 20 to function as a repository for data collected from the vehicle 16. In some instances, another facility may function as a repository for the collected data (e.g., a customer relationship management system (not shown) associated with the center 20 whose database(s) the central server 18 or advisors 74, 74' can access).

As illustrated in FIG. 1, the various call center components are coupled to one another via a network connection or bus 78, which may be similar to the vehicle bus 44 previously described.

It is to be appreciated that the center 20 may be any central or remote facility, manned or unmanned, mobile or fixed, to or from which it is desirable to exchange voice and data communications. As such, the live advisor 74' may be physically present at the center 20 or may be located remote from the center 20 while communicating therethrough.

The center 20 shown in FIG. 1 may also be virtualized and configured in a Cloud Computer, that is, in an Internet-based computing environment. For example, the computer equipment 70 may be accessed as a Cloud platform service, or PaaS (Platform as a Service), utilizing Cloud infrastructure rather than hosting computer equipment 70 at the center 20. The database 76 and central server 18 may also be virtualized as a Cloud resource. The Cloud infrastructure, known as IaaS (Infrastructure as a Service), typically utilizes a platform virtualization environment as a service, which may include components such as the computing equipment 70, database 76, central server 18, and other computer equipment. In an example, the real-time carpooling services disclosed herein may be performed in the Cloud via the SaaS (Software as a Service).

The components of the system 10 of FIG. 1 are utilized to provide enhanced feature services to users 14. Examples of the enhanced feature services are shown in FIGS. 2A-2C and 3, which will now be described in detail.

The examples in both FIGS. 2A-2C and FIG. 3 begin with the enhanced service feature request being sent from the mobile device 12 or 12' directly or indirectly to the central server 18. The user 14 utilizes the application 58 on the mobile device 12 (e.g., smart phone) or an appropriate button on the mobile device 12' (e.g., passive entry passive start, PEPS, device) to initiate the desired enhanced service feature request.

In one example, the respective transceiver 34', 34" transmits the request directly to the central server 18 using the carrier/communication system 22. In other examples, the transceiver 34" of the mobile device 12' (e.g., passive entry passive start device) transmits the request indirectly to the central server 18 through other components of the system. As examples, the transceiver 34" of the mobile device 12' may transmit the request, via short range wireless communication, to the VCP 32 paired with the device 12' of the vehicle 16 associated with the device 12' or to the TPM 33 paired with the device 12' of the vehicle 16 associated with the device 12'. When the VCP 32 receives the request, the VCP 32 (via transceiver 34 and vehicle bus 44) transmits the request directly to the server communication transceiver 68 of the central server 18. When the TPM 33 receives the request, the TPM 33 transmits the request to the VCP 32, and the VCP 32 (via transceiver 34 and vehicle bus 44) transmits the request directly to the server communication transceiver 68 of the central server 18.

When the enhanced service feature request is received by the central server 18 (via server communication transceiver 68), the central server 18 launches the real-time enhanced feature service program 64 using the central processing unit 62. The central processing unit 62, running the enhanced feature service program 64, identifies the type of request that has been received. The central processing unit 62 is programmed to execute different computer readable instructions of the real-time enhanced feature service program 64 depending on the type of request that is received.

When the request is identified as a request to light the user's path (FIGS. 2A-2C), the central processing unit 62 identifies the vehicle 16 that is associated with request. The central processing unit 62 identifies the vehicle 16 from an identifier received in the request. In one example, the central processing unit 62 may identify the vehicle 16 through the vehicle identifier (e.g., VIN number, etc.) which is transmitted with the request. In another example, the central processing unit 62 may identify the vehicle 16 using the mobile device identifier which is transmitted with the request. In this example, the central processing unit 62 queries the database 76 with the mobile device identifier to identify the vehicle 16 that is linked to the mobile device 12, 12' having that identifier.

Figure 2A:
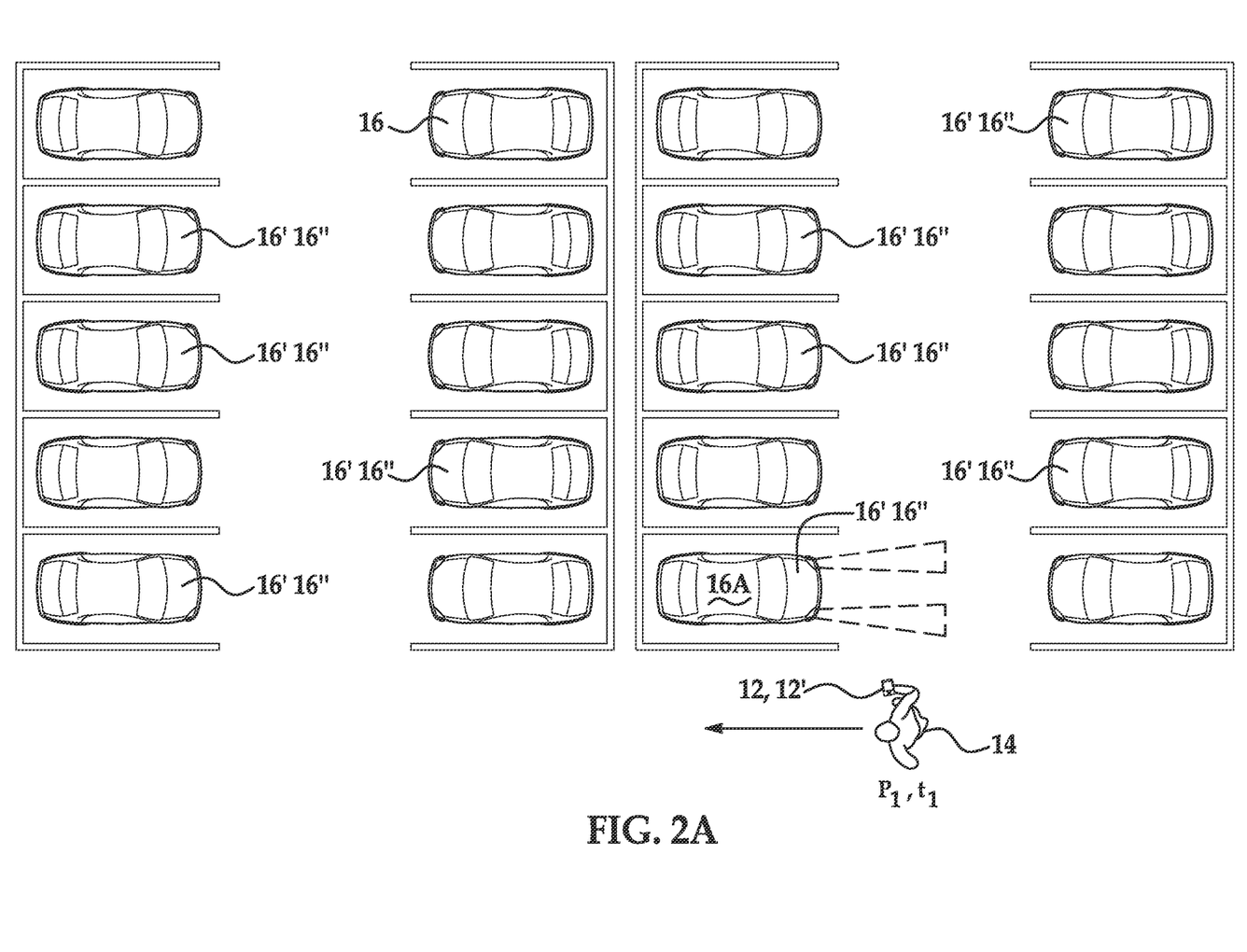
FIGS. 2A through 2C are schematic views which together illustrate one example of a multi-vehicle user-assistance method.
Figure 2B:
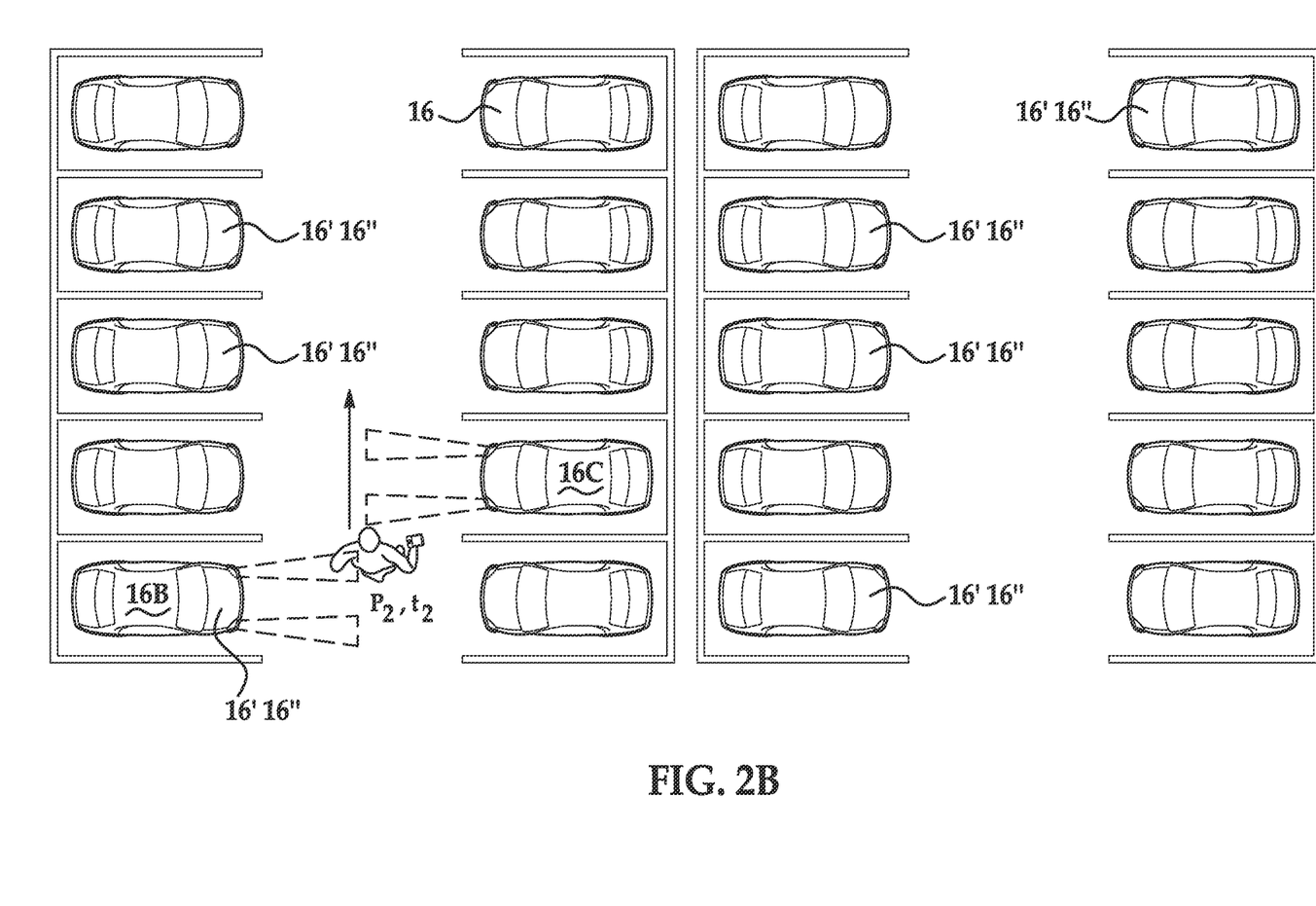
Figure 2C:
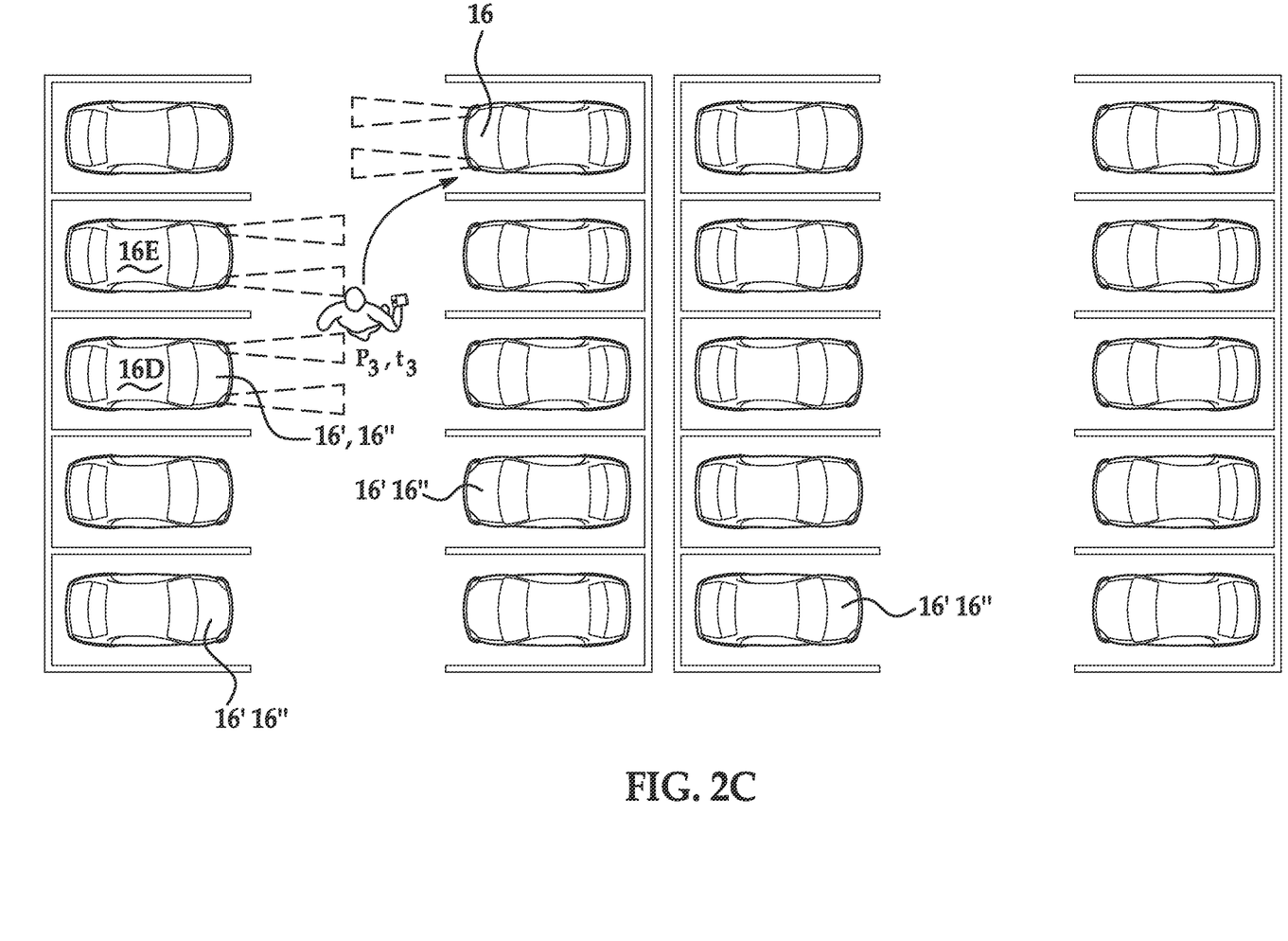

Once the vehicle 16 associated with the request is identified, the central processing unit 62 identifies a location of the vehicle 16. In one example, the central processing unit 62 transmits a request to the vehicle 16 for its current location. The vehicle 16, through the VCP 32 and the location detection unit 42, transmits its current location back to the central server 18. In another example, the central processing unit 62 may utilize features of short range wireless communication technology (e.g., BLUETOOTH®) to determine the vehicle location with respect to the mobile device 12, 12').

In this example, central processing unit 62, running the enhanced feature service program 64, then identifies a location of a plurality of participating vehicles 16', 16" (other than the vehicle 16, i.e., vehicles that are unassociated with the mobile device 12, 12') positioned within proximity of the mobile device 12, 12'.

In the examples disclosed herein, the phrase "within proximity of the location of the mobile device 12, 12'" may vary depending upon the type of request received by the central server 18. In one example, regardless of the type of request (e.g., path lighting, locate me, etc.), the phrase "within proximity of the location of the mobile device 12, 12' may include any participating vehicle 16, 16', 16" within a predefined geographic area or boundary around the location of the mobile device 12, 12'. This predefined geographic area/boundary may be dynamically selected by the central processing unit 62 using a graph based map and taking into account the location of the mobile device 12, 12' and the user's vehicle 16. For example, if the mobile device 12, 12' is located in a parking lot with lots of cars around (e.g., as shown in FIG. 2A), the predefined geographic area/boundary may encompass several rows of the parking lot near the location of the mobile device 12, 12' and the location of the vehicle 16. Alternatively, if the mobile device 12, 12' is located on a sidewalk, the predefined geographic area/boundary may encompass a portion of the street adjacent to the sidewalk, nearby intersecting streets, etc. In some instances, the central processing unit 62 may be programmed to identify all of the participating vehicles within the predefined geographic boundary, and then narrow the identified participating vehicles to the select number that will be used to respond to the specific request.

In one example with the path lighting request, the central processing unit 62 may be programmed to identify all the participating vehicles 16', 16" within the predefined geographic boundary, and then to dynamically narrow the identified participating vehicles 16', 16" to those that are positioned i) between the location of the user's vehicle 16 and the user's location (as determined by the location of the mobile device 12, 12') and ii) near the then-current location of the mobile device 12, 12'. In the example shown in FIG. 2A, all of the vehicles 16, 16' within the 4 rows of cars shown have been identified by the server 18 as participating vehicles 16', 16".

In another example with the path lighting request, the central processing unit 62 may be programmed to dynamically identify participating vehicles 16', 16" that are positioned i) between the location of the user's vehicle 16 and the user's location (as determined by the location of the mobile device 12, 12') and ii) near the then-current location of the mobile device 12, 12' (e.g., without first using a larger boundary).

In yet another example with the path lighting request, the central processing unit 62 may be programmed to dynamically identify participating vehicles 16', 16" through the vehicle 16. For example, the VCP 32 may be aware of the presence of other nearby vehicles 16', 16" through the TPMs 32, 32', 32", which have identified one another using short range wireless communication. The identity of these other vehicles 16', 16" may be transmitted from the vehicle 16 to the central server 18. The server 18 may then identify which of the participating vehicles 16', 16" are positioned i) between the location of the user's vehicle 16 and the user's location (as determined by the location of the mobile device 12, 12') and ii) near the then-current location of the mobile device 12, 12'.

In still another example with the path lighting request, the central processing unit 62 may be programmed to dynamically identify participating vehicles 16', 16" without using the location of the user's vehicle 16. In this example, the central processing unit 62 may be programmed to dynamically identify the participating vehicles 16', 16" that are positioned near the then-current location of the mobile device 12, 12'.

In this example, central processing unit 62, running the enhanced feature service program 64, continuously monitors the location of the mobile device 12, 12'). FIG. 2A illustrates the location ($P_1$) of the mobile device 12, 12' (and user 14) at time 1 ($t_1$), FIG. 2B illustrates the location ($P_2$) of the mobile device 12, 12' (and user 14) at time 2 ($t_2$), and FIG. 2C illustrates the location ($P_3$) of the mobile device 12, 12' (and user 14) at time 3 ($t_3$). The continuous monitoring of the location/position of the mobile device 12, 12' allows the central processing unit 62 to determine which participating vehicle 16', 16" to transmit lighting instructions to. In one example, the central processing unit 62, running the enhanced feature service program 64, may be programmed to continuously transmit a request to the mobile device 12, 12' for its current location. The mobile device 12, 12', through the MDCP 32', 32" and the location detection unit 42', transmits its current location back to the central server 18. In another example, the mobile device 12, 12', through the MDCP 32', 32" and the location detection unit 42', may be programmed to continuously transmit its current location to the central server 18. The monitoring of the mobile device 12, 12' location may occur simultaneously with the identification of the location of the participating vehicles 16', 16".

In this example, the central processing unit 62 dynamically generates or retrieves previously generated and stored instructions that command the vehicle 16', 16" receiving the instructions to activate the headlights 52 and/or tail lights 54 and/or side marker light(s). In some examples, the instructions are to activate the headlights 52, the tail lights 54, or both the headlights 52 and the tail lights 54 simultaneously. In other examples, the instructions also or alternatively activate the side marker light(s). The instructions generated or retrieved may depend, at least in part, on the position of the vehicle 16', 16' with respect to the location of the mobile device 12, 12' when it is within proximity of the vehicle 16', 16". In an example, the mobile device 12, 12' is considered to be within proximity of the participating vehicle 16', 16" when the mobile device 12, 12' is located within 15 feet of the vehicle exterior. On the one hand, when the vehicle location data and the mobile device location data indicate (alone or in combination with camera data, parking sensor data, etc.) that the front of the vehicle 16', 16" faces the approaching mobile device 12, 12', then the instructions generated or retrieved may be to command the vehicle 16', 16" to activate the headlights 52. On the other hand, when the vehicle location data and the mobile device location data (alone or in combination with camera data, parking sensor data, etc.) indicate that the rear of the vehicle 16', 16" faces the approaching mobile device 12, 12', then the instructions generated or retrieved may command the vehicle 16', 16" to activate the tail lights 54. In still another example, when the vehicle location data and the mobile device location data (alone or in combination with camera data, parking sensor data, etc.) indicate that the side of the vehicle 16', 16" faces the approaching mobile device 12, 12', then the instructions generated or retrieved may command the vehicle 16', 16" to activate the side marker light(s).

The generated or retrieved instructions are then transmitted by the server communication transceiver 68 (in response to instructions from the central processing unit 62) to the vehicle bus 44 of the participating vehicle 16', 16" that is currently within proximity of the mobile device 12, 12'. The vehicle bus 44 sends the instructions to the body control module 56, which is capable of decoding the instructions and activating the headlights(s) 52 and/or tail lights(s) 54 in accordance with the instructions. The instructions may command the headlights(s) 52 and/or tail lights(s) 54 to remain on for some preset time period (e.g., from about 1 second to about 1 minute), or the headlights(s) 52 and/or tail lights(s) 54 may remain on until the central server 62 transmits an updated instruction commanding the body control module 56 light(s) 52, 54 to turn off the light(s) 52 and/or 54.

In response to the path lighting request, the central server 18 can dynamically identify participating vehicles 16', 16" that are within proximity of the moving mobile device 12, 12', and can transmit respective instructions to each of the identified participating vehicles 16', 16" to activate the lighting component(s) 52, 54 of the identified participating vehicles 16, 16' when the mobile device 12, 12' is within proximity of each of the identified participating vehicles 16', 16". The lighting of the vehicles 16', 16" may be sequential and may correspond with the movement of the mobile 12, 12' in order to light the path as the user 14 traversed his/her route toward his/her vehicle 16. An example of this is shown from FIG. 2A to FIG. 2B to FIG. 2C, where the headlights 52 of one of the participating vehicle(s) 16A are illuminated when the mobile device 12, 12' is within proximity (FIG. 2A), where the headlights 52 of two of the participating vehicle(s) 16B, 16C are illuminated when the mobile device 12, 12' is within proximity (FIG. 2B), and where the headlights 52 of two more of the participating vehicle(s) 16D, 16E are illuminated when the mobile device 12, 12' is within proximity (FIG. 2C).

As shown in FIG. 2C, when the user 14 is within proximity of his/her own vehicle 16, the server communication transceiver 68 can transmit instructions to the vehicle 16 to activate the headlights(s) 52 and/or tail lights(s) 54.

In addition to activating the lights 52, 54 of several of the participating vehicles 16, 16', 16", the central server 18 may also be programmed to transmit respective additional instructions to the participating vehicles 16', 16" to individually command the vehicles 16', 16" to activate any of the camera(s), alarm, or a data collection event. These additional commands may be in response to another request received from the user 14 through his/her mobile device 12, 12'. For example, the user may activate a panic button (e.g., if someone is following him/her, or he/she arrives at his/her vehicle 16 and it has been broken into, or for any other suitable reason). This triggers a request to be sent to the central server 18, which responds by generating and transmitting instructions to activate the cameras and/or alarms of several of the participating vehicles 16, 16', 16" in the area, and or by generating and transmitting instructions to initiate a data collection event. These additional commands may be in response to other triggers not initiated by the user 14. For example, movement of an external vehicle door or trunk handle, a broken vehicle window, or other events may trigger a request to be sent to the central server 18, which responds by generating and transmitting instructions to activate the cameras and/or alarms of several of the participating vehicles 16, 16', 16" in the area. Data collected by the cameras may be useful for law enforcement (e.g., when the user's vehicle 16 has been broken into or some other incident has taken place).

When the central server 18 transmits a command for data collection, each of the participating vehicles 16, 16', 16" actively collects information from active smart devices within short wireless communication range of the vehicles 16, 16', 16". For example, the vehicles 16, 16', 16" may collect short range wireless node addresses and MAC (media access control) addresses of active smart devices. Data collected in this manner may be also useful for law enforcement (e.g., when the user's vehicle 16 has been broken into or some other incident has taken place and the perpetrator has an active smart device).

As mentioned above, the central processing unit 62 is programmed to execute different computer readable instructions of the real-time enhanced feature service program 64 depending on the type of request that is received. When the request is identified as a user locator request (FIG. 3), the user 14 is requesting assistance (e.g., if he/she has fallen and needs assistance, has been attacked and needs assistance, or the like).

In response to the user locator request, the central processing unit 62, running the enhanced feature service program 64, identifies a location of a plurality of participating vehicles 16', 16" (at least some of which are vehicles 16', 16" that are unassociated with the mobile device 12, 12') positioned within proximity of the mobile device 12, 12'. In this example, the central processing unit 62 may first identify any participating vehicle 16, 16', 16" within a predefined geographic area or boundary around the location of the mobile device 12, 12'. This predefined geographic area/boundary may be dynamically selected by the central processing unit 62 using a graph based map and taking into account the location of the mobile device 12, 12'. In the example shown in FIG. 3, all of the vehicles 16, 16' within the 4 rows of cars shown have been identified by the server 18 as participating vehicles 16', 16".

Figure 3:
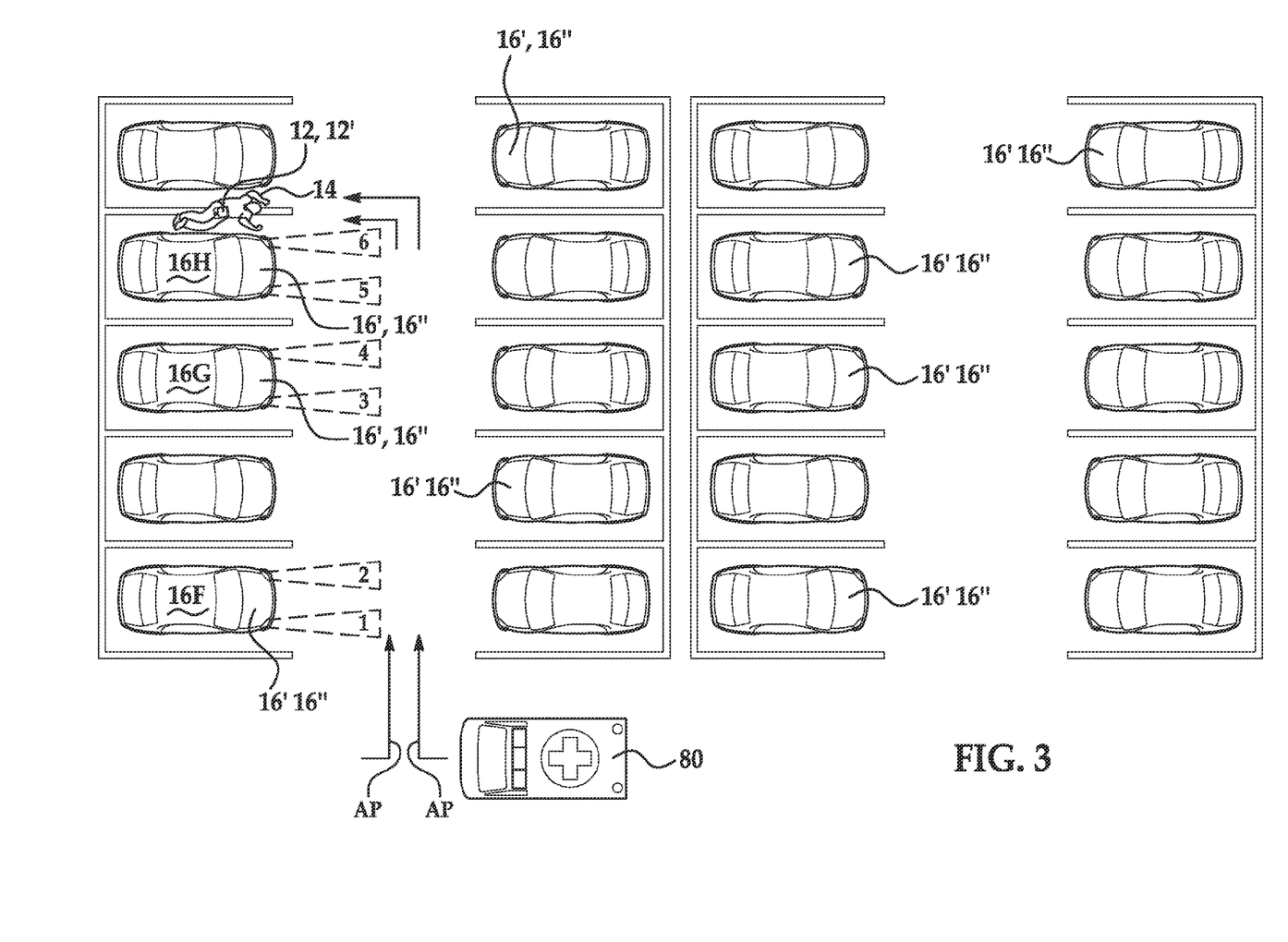
FIG. 3 is a schematic view illustrating another example of a multi-vehicle user-assistance method.

Using the location information of the mobile device 12, 12' and the identified participating vehicles 16, 16', the central processing unit 62, running the enhanced feature service program 64, then generates a vehicle lighting pattern. The vehicle lighting pattern involves the activation of the light(s) 52, 54 of a select number of the identified participating vehicles 16, 16' in a manner that together indicates a direction of the location of the mobile device 12, 12'. For example, the lights may selectively illuminate so that the first light is furthest from the mobile device location, and so that each subsequently activated light 52, 54 is closer to the mobile device location.

To generate the vehicle lighting pattern, the central processing unit 62 identifies an access path to the mobile device 12, 12'. In an example, the access path may be identified using a graph based map of the area surrounding the mobile device 12, 12'. In another example, the access path may be identified using the locations of the identified participating vehicles 16, 16'. The access path may be a driving path that will lead to a location near the user 14 (as identified by the mobile device 12, 12' location). If the user 14 is not in a parking lot or other area where vehicles 16, 16', 16" can readily travel, the access path may include a portion that is drivable and then a portion that is traversable via foot, bike, or some other mode of transportation.

For the portion of the access path that is accessible via the vehicle 16, 16', 16", the central processing unit 62 determines a number of the previously identified plurality of participating vehicles 16', 16" that are positioned along the access path. The central server 18 may narrow down the participating vehicles 16, 16', 16" to those that are positioned along the access path. The position of each of the participating vehicles with respect to the access path and with respect to the location of the mobile device 12, 12' may be considered when narrowing down the vehicles 16', 16" to the select number or list.

In the example shown in FIG. 3, the central processing unit 62 identifies the access path AP by evaluating the area around the mobile device 12, 12', and identifying a route that will enable a vehicle (e.g., an emergency vehicle 80) to get close to the mobile device 12, 12'. In the example shown, the central processing unit 62 recognizes that the mobile device 12, 12' is located down one row of a parking lot, and that a road is located at the opposed end of that parking lot. The row provides vehicle access from the road to the mobile device 12, 12' and the user 14.

Once the access path AP is generated, the central processing unit 62 then narrows down the participating vehicles that are positioned along the access path AP and in a suitable position to implement the vehicle lighting pattern. In the example in FIG. 3, the central processing unit 62 determines that three participating vehicles 16F, 16G, 16H on the access path AP and on the same side of the parking lot row as the user 14 and mobile device 12, 12' will be the select number that will be involved in implementing the vehicle lighting pattern.

In this example, the central processing unit 62 dynamically generates instructions for the select number of vehicles 16', 16" that will be involved in executing the vehicle lighting pattern. The generated instructions (and the respective vehicle 16', 16" associated with those instructions) may be assigned a lighting order. The lighting order may indicate to the vehicle 16', 16" its position within the lighting pattern, and may be based upon the position of each of the select number of the identified participating vehicles 16', 16" with respect to the location of the mobile device 12, 12'. In this example, the vehicle 16', 16" receiving the instructions is commanded to activate the headlights 52 and/or tail lights 54 sequentially (e.g., left then right, or right then left, depending on the vehicle lighting pattern) and in accordance with the lighting order. The instructions for the lighting order may also have a time associated therewith, a start delay associated therewith, and/or a frequency associated therewith so that the vehicles 16', 16" receiving the instructions know when to activate the lights with respect to the other vehicles 16', 16" involved in the vehicle lighting pattern.

The generated instructions are then respectively transmitted by the server communication transceiver 68 to the vehicle bus 44 of each of the participating vehicles 16', 16" in order to execute the vehicle lighting pattern. The instructions may be sent to the vehicles 16', 16" in the order that the lighting pattern is to be executed (e.g., to vehicle 16 F, then vehicle 16G, then vehicle 16H), or simultaneously. When sent simultaneously, the lighting order, timing, start delay and/or frequency, and the number of participating vehicles being utilized in the lighting pattern are transmitted in the instructions, so that each vehicle 16', 16" knows when and in what order to activate the light(s) 52, 54.

As previously described in reference to FIGS. 2A through 2C, the respective vehicle buses 44 send the received instructions to the respective body control (or other) modules 56, which are capable of decoding the instructions and activating the headlights(s) 52 and/or tail lights(s) 54 in accordance with the instructions. In this example, the lighting of the vehicles 16', 16" may be sequential and correspond with the vehicle lighting pattern. An example of this is shown from FIG. 3, where the headlights 52 and/or turn signals of one of the participating vehicle(s) 16F are sequentially illuminated (1 then 2), and then the headlights 52 and/or turn signals of another of the participating vehicle(s) 16G are sequentially illuminated (3 then 4), and then the headlights 52 and/or turn signals of still another of the participating vehicle(s) 16H are sequentially illuminated (5 then 6). Together, the blinking lights illuminated in the order of 1 to 6 form the lighting pattern that indicates the general direction of the mobile device 12, 12' location along the access path AP.

In the example shown in FIG. 3, if the user's vehicle 16 is nearby, the central processing unit 62 may include the vehicle 16 in the vehicle lighting pattern or in a variation of the vehicle lighting pattern. For example, the participating vehicles 16', 16" may participate in the vehicle lighting pattern, and the user's vehicle 16 may be instructed to constantly blink to help identify the vehicle 16 as the user's.

In addition to activating the lights 52, 54 of several of the participating vehicles 16, 16', 16", the central server 18 may also be programmed to transmit respective additional instructions to the participating vehicles 16', 16" (e.g., those participating in the vehicle lighting pattern) to individually command the vehicles 16', 16" to activate any of the camera(s), alarm(s), or the data collection event. In this example, these commands may be transmitted simultaneous with the vehicle lighting pattern instructions or after the vehicle lighting pattern instructions are sent. If the user 14 is requesting assistance, he/she may not be able to send another request. Alternatively, other triggers (such as vehicle door handle activation, broken window, etc.) may initiate the request for camera and/or alarm activation and/or a data collection event). The cameras and/or data collection event may be of use capturing a perpetrator or locate the missing vehicle 16 if the location detection unit 42 is not functional, and the alarm(s) may draw further attention to the user's position.

In FIG. 3, the user 14 has requested the user locator service using a panic button or icon on his/her mobile device 12, 12'. In some instances, the central server 18 can pass the request (including the mobile device 12, 12' location information) on to the live advisor 74' at the center 20. The live advisor 74' can inform an appropriate emergency entity (e.g., EMS, police, fire, etc.) of the situation. The emergency entity may then send the emergency vehicle 80 to the mobile device's location.

In these instances, the central processing unit 62 may be programmed to monitor the position of the emergency vehicle 80. In one example, the central processing unit 62, running the enhanced feature service program 64, may be programmed to continuously transmit a request to the emergency vehicle 80 for its current location. The emergency vehicle 80, through its VCP and location detection unit, transmits its current location back to the central server 18. The monitoring of the location/position of the emergency vehicle 80 allows the central processing unit 62 to narrow the originally identified participating vehicles 16', 16" to generate a list of the participating vehicles 16', 16" that are positioned between the location of the mobile device 12, 12' and the location of the emergency vehicle 80. These vehicle 16', 16" may then be used to generate the vehicle lighting pattern (e.g., lighting order, instructions, etc.).

In another example, the monitoring of the location/position of the emergency vehicle 80 allows the central processing unit 62 to base the access path AP or change the access path AP based upon the position of the emergency vehicle 80. In this example, the participating vehicles 16', 16" may be identified and included in the vehicle lighting pattern as previously described, except that the access path AP will be based on an emergency vehicle 80 heading to the scene.

Using the position of the emergency vehicle 80 may help to determine which of the participating vehicles 16', 16" are best positioned to be utilized in the vehicle lighting pattern.

In still another example not shown in the figures, the path lighting and/or user locator services may be performed without the central server 18 and through vehicle-to-vehicle communications. In these examples, the real-time enhanced feature service program 64 may be present in the memory 50 of the vehicle 16. In these examples, the vehicle 16 may identify the participating vehicles 16', 16" that are within proximity of the mobile device 12, 12' and/or vehicle 16, and generate and transmit instructions for activating the exterior lighting component 52 and/or 54 of the other vehicles 16',

16" as the mobile device 12, 12' is within proximity of the vehicles 16', 16" or as part of the vehicle lighting program.

In these examples, the VCP 32 of the vehicle 16 functions as the central server 18. The vehicle 16 can locate the participating vehicles 16', 16" through various short range wireless communications. As an example, the vehicle's TPM 33 may be aware (through short range communication) of the tire pressure monitors 33 of other vehicles 16', 16". As another example, the vehicle's transceiver 34 may be aware of the transceivers 34 of other vehicles 16', 16". Upon identifying the other vehicles 16', 16", the vehicle 16 can utilize the mobile device 12, 12' position and the other vehicle's position to light a path or generate a lighting pattern in a manner previously described. In these examples, the VCP 32 may utilize short range wireless communication technology to transmit the instructions to the other vehicles 16', 16".

In the examples disclosed herein, it is to be understood that the term "communication" as used herein is to be construed to include all forms of communication, including direct and indirect communication. Indirect communication may include communication between two components with additional component(s) located therebetween.

Further, the terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween).

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range. For example, a range from about 10 meters to about 100 meters should be interpreted to include the explicitly recited limits of about 10 meters to about 100 meters, as well as individual values, such as 18.5 meters, 30 meters, 82 meters, etc., and sub-ranges, such as from about 15 meters to about 75 meters, from about 10 meters to about 50 meters, etc. Furthermore, when "about" is utilized to describe a value, this is meant to encompass minor variations (up to +/−10%) from the stated value.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

The invention claimed is:

1. A multi-vehicle user-assistance system, comprising:
   a mobile device having a mobile device communications platform and a location detection unit;
   a plurality of participating vehicles, each participating vehicle including a vehicle communications platform, a vehicle location detection unit, and an exterior lighting component; and
   a central server, including a central processing unit, to receive a request directly or indirectly from the mobile device communications platform, the request including a location of the mobile device, and the central processing unit programmed to:
      identify any of the participating vehicles that are positioned within proximity of the location of the mobile device at a time of the request;
      generate a vehicle lighting pattern using location information for each of the identified participating vehicles; and
      transmit respective instructions to a select number of the identified participating vehicles, the respective instructions individually commanding the select number of number of the identified vehicles to activate the exterior lighting component such that together the select number of the identified participating vehicles execute the vehicle lighting pattern.

2. The multi-vehicle user-assistance system as defined in claim 1 wherein the vehicle lighting pattern indicates a direction of the location of the mobile device.

3. The multi-vehicle user-assistance system as defined in claim 2 wherein the exterior lighting component is selected from the group consisting of a headlight, a tail light, a side marker light, and combinations thereof, and wherein the vehicle lighting pattern is executed by sequential illumination of the headlight, the tail light, the side marker light, or combinations thereof of each of the select number of the identified participating vehicles.

4. The multi-vehicle user-assistance system as defined in claim 1 wherein the central processing unit is further programmed to generate the vehicle lighting pattern by:
   identifying an access path to the mobile device;
   determining the select number of the identified participating vehicles that are positioned along the access path;
   assigning a lighting order to the select number of the identified participating vehicles based upon a position of each of the select number of the identified participating vehicles with respect to the location of the mobile device; and
   generating the respective instructions for each of the select number of the identified participating vehicles.

5. The multi-vehicle user-assistance system as defined in claim 1, further comprising an emergency vehicle to locate the mobile device, and wherein the central processing unit is further programmed to:
   identify a location of the emergency vehicle;
   narrow the identified participating vehicles to a list of the participating vehicles that are positioned between the location of the mobile device and the location of the emergency vehicle; and
   generate the vehicle lighting pattern using the list of the participating vehicles.

6. The multi-vehicle user-assistance system as defined in claim 1 wherein the mobile device is a smart phone or a passive entry passive start device.

7. The multi-vehicle user-assistance system as defined in claim 1 wherein the central processing unit is further programmed to transmit respective additional instructions to the select number of the identified participating vehicles, the respective additional instructions individually commanding the select number of number of the identified vehicles to activate any of a vehicle camera, a vehicle alarm, or a data collection event.

8. The multi-vehicle user-assistance system as defined in claim 1 wherein the central server further includes a server communication transceiver to receive the request.

9. A multi-vehicle user-assistance system, comprising:
a mobile device having a location detection unit and a mobile device communications platform;
a first vehicle associated with the mobile device, the first vehicle including a first vehicle communications platform and a first vehicle location detection unit; and
a central server, including a central processing unit, to receive a request directly or indirectly from the mobile device communications platform, the request including a location of the mobile device and a first identifier, and the central processing unit programmed to:
identify the first vehicle from the first identifier;
identify a location of the first vehicle;
identify a participating vehicle that is unassociated with the mobile device and is positioned between the location of the mobile device and the location of the first vehicle;
continuously monitor the location of the mobile device; and
transmit instructions to the participating vehicle to activate a lighting component of the participating vehicle as the mobile device is within proximity of the participating vehicle.

10. The multi-vehicle user-assistance system as defined in claim 9 wherein the mobile device is a smart phone or a passive entry passive start device.

11. The multi-vehicle user-assistance system as defined in claim 9 wherein the lighting component is a headlight, a tail light, a side marker light, or combinations thereof of the participating vehicle.

12. The multi-vehicle user-assistance system as defined in claim 9 wherein the central processing unit is further programmed to transmit instructions to the first vehicle to activate a lighting component of the first vehicle as the mobile device is within proximity of the first vehicle.

13. A multi-vehicle user-assistance system, comprising:
a mobile device having a location detection unit and a mobile device communications platform;
a first vehicle associated with the mobile device, the first vehicle including a first vehicle communications platform and a first vehicle location detection unit;
a plurality of participating vehicles; and
a central server, including a central processing unit, to receive a request directly or indirectly from the mobile device communications platform, the request including a location of the mobile device and a first identifier, and the central processing unit programmed to:
identify the first vehicle from the first identifier;
identify a location of the first vehicle;
identify any of the plurality of the participating vehicles positioned between the location of the mobile device and the location of the first vehicle along a path to the first vehicle;
continuously monitor the location of the mobile device; and
transmit respective instructions to each of the identified participating vehicles to sequentially activate the lighting component of each of the identified participating vehicles as the mobile device is within proximity of each of the identified participating vehicles.

14. The multi-vehicle user-assistance system as defined in claim 9 wherein the central processing unit is further programmed to transmit additional instructions to the participating vehicle, the additional instructions commanding the participating vehicle to activate any of a vehicle camera, a vehicle alarm, or a data collection event.

15. The multi-vehicle user-assistance system as defined in claim 9 wherein the central server further includes a server communication transceiver to receive the request.

16. A multi-vehicle user-assistance method, comprising:
receiving, at a central server, a request from a mobile device, the request including a location of the mobile device;
by a central processing unit of the central server, identifying a location of a plurality of participating vehicles positioned within proximity of the mobile device, wherein the participating vehicles are unassociated with the mobile device; and
by the central processing unit of the central server, respectively transmitting instructions to at least some of the participating vehicles to activate an exterior lighting component i) as the mobile device is within proximity of the at least some of the participating vehicles or ii) as part of a vehicle lighting pattern.

17. The multi-vehicle user-assistance method as defined in claim 16, further comprising generating the vehicle lighting pattern by:
identifying an access path to the mobile device;
determining a number of the plurality of participating vehicles that are positioned along the access path;
assigning a lighting order to the number of the plurality of participating vehicles that are positioned along the access path based upon a position of each of the number of the plurality of participating vehicles with respect to the location of the mobile device; and
generating instructions for each of the number of the plurality of participating vehicles which correspond to the instructions to be respectively transmitted to the at least some of the participating vehicles.

18. The multi-vehicle user-assistance method as defined in claim 17 wherein the vehicle lighting pattern indicates a direction of the location of the mobile device along the access path.

19. The multi-vehicle user-assistance method as defined in claim 16 wherein the exterior lighting component is selected from the group consisting of a headlight, a tail light, a side marker light, and combinations thereof, and wherein the method further comprises sequentially illuminating the headlight, the tail light, the side marker light, or combinations thereof of each of the participating vehicles in response to the respectively transmitted instructions.

20. The multi-vehicle user-assistance method as defined in claim 16, further comprising:
receiving a first vehicle identifier with the request; and
by the central processing unit:
identifying a first vehicle from the first vehicle identifier, the first vehicle being associated with the mobile device;
identifying a location of the first vehicle;
identifying, from the plurality of the participating vehicles, those participating vehicles positioned between the location of the mobile device and the location of the first vehicle along a path to the first vehicle; and continuously monitoring the location of the mobile device to determine when the mobile device is within proximity of each of the identified participating vehicles.

21. The multi-vehicle user-assistance method as defined in claim 16, further comprising respectively transmitting additional instructions to the at least some of the participating vehicles to activate any of a vehicle camera, a vehicle alarm, or a data collection event.

* * * * *